United States Patent [19]
Arinobu et al.

[11] Patent Number: 4,814,935
[45] Date of Patent: Mar. 21, 1989

[54] CIRCUIT BREAKER REACTIVE TO THREE TIME-OVERCURRENT CHARACTERISTICS

[75] Inventors: Ichirou Arinobu; Yoshihiro Hatakeyama, both of Fukuyama, Japan

[73] Assignee: Mitsubishi Denki Kabushiki Kaisha, Tokyo, Japan

[21] Appl. No.: 77,935

[22] Filed: Jul. 27, 1987

[51] Int. Cl.$^4$ .......................... H02H 3/34; H02H 3/093
[52] U.S. Cl. .......................................... 361/96; 361/97; 361/94; 361/87
[58] Field of Search .................. 361/87, 93, 94, 95, 361/96, 97, 98, 100

[56] References Cited

U.S. PATENT DOCUMENTS

| | | | |
|---|---|---|---|
| 3,440,491 | 4/1969 | Tenenbaum et al. | 361/94 |
| 3,633,073 | 1/1972 | Day et al. | 361/95 |
| 3,786,311 | 1/1974 | Hobson, Jr. et al. | 361/95 |
| 3,846,675 | 11/1974 | Shimp | 361/100 |
| 4,246,623 | 1/1981 | Sun | 361/94 |
| 4,377,836 | 3/1983 | Elms et al. | 361/96 |
| 4,694,373 | 9/1987 | Demeyer | 361/96 |

FOREIGN PATENT DOCUMENTS

| | | |
|---|---|---|
| 0133968 | 3/1983 | European Pat. Off. . |
| 0207880 | 1/1987 | European Pat. Off. . |
| 3114213 | 3/1983 | Fed. Rep. of Germany . |

OTHER PUBLICATIONS

E. Schweitzer and A. Aliaga, "Digital Programmable Time-Parameter Relay Offers Versatility and Accuracy", IEEE Transactions on Power Apparatus and Systems, vol. PAS-99, No. 1 (Jan./Feb. 1980).

Primary Examiner—A. D. Pellinen
Assistant Examiner—H. L. Williams
Attorney, Agent, or Firm—Lowe, Price, Leblanc, Becker & Shur

[57] ABSTRACT

A circuit breaker having three level discriminating circuits and time-current operating circuits, respectively corresponding to an instantaneous releasing, a short time characteristic releasing and a long time characteristic releasing of disconnectable contacts.

5 Claims, 8 Drawing Sheets

CIRCUIT BREAKER REACTIVE TO THREE TIME-OVERCURRENT CHARACTERISTICS

FIELD OF THE INVENTION AND RELATED ART STATEMENT

1. FIELD OF THE INVENTION

The present invention relates to a circuit breaker and more particularly to that which can prevent releasing operation of power lines.

2. DESCRIPTION OF THE RELATED ART

FIG. 15 shows a circuit breaker of a prior art disclosed in published unexamined Japanese patent application No. SHO 60-32211. In FIG. 15, on a set of power lines, namely, R, S and T of three phase power lines 10, current transformers 21,22 and 23 of a current sensor means 200 are provided, respectively. Full-wave rectifiers 31, 32 and 33 are connected with its two input lines across both output lines of the current transformers 21, 22 and 23, respectively. Burden circuit 41, 42 and 43 are connected with their input lines to output lines of the full-wave rectifiers 31, 32 and 33, respectively, and each one of the input lines of the burden circuits 41, 42 and 43 are connected in common to the ground. The other input terminals of the burden circuits 41, 42 and 43 are connected to input terminals of an OR circuit 130, which consists of three diodes 131, 132 and 133, and output terminal of which are connected in common as an output terminals of the OR circuit 130. Adjustable output terminals of the burden circuits 41, 42 and 43, wherefrom output signals is obtainable in desirably adjusted levels, are connected to input terminals of mean/effective value circuits 91, 92 and 93 of mean/effective value means 90, which are for producing mean values or effective values of the signals from the burden circuits 41, 42 and 43. The output terminals of the mean/effective value circuits 91, 92 and 93 are connected to input terminals of OR circuit 160 which consists of three diodes 161, 162 and 163 and issues output signal to the A/D converter 100. A microcomputer 110 is connected to the output terminal of the A/D converter 100. The output terminal of the OR circuit 130, as a second output terminal of the sensor means 200, is connected to the A/D converter 100 and the microcomputer 110 through a power source circuit 300, which is generally a constant voltage circuit. Furthermore, the second output terminal of the current sensor means 200 is connected to a second level discrimination circuit 140 which, for instance, comprises at least one zener diode. The second level discrimination circuit 140 is connected to a second time-current tripping circuit 150. Output terminals of the microcomputer 110 and the second time-current operating circuit 150 are connected to an output circuit 120 through an OR gate 121. The output circuit 120, for instance, comprising a thyristor, actuates a releasing device 80 for carrying out disconnection of line switches 201, 202 and 203. An indicator 180 are for indicating that the releasing device 80 has operated. The microcomputer 110 comprises a first level discrimination means and a first time-current operating means as is described later herein.

The current sensor means 200 issues from the mean/effective value circuit 90 signals corresponding to mean values or effective values of the current in the power lines R, S and T, and also issues from the OR circuit 130 the second output signals corresponding to peak value of the current in the power line R, S and T. The second output signal of the current sensor means is given through the second level discrimination circuit 140 to the second time-current operating circuit 150. The A/D converter 100 and the microcomputer 110 are fed with a constant voltage D/C current from the power source circuit 300.

When overcurrent(s) flows in the AC power lines 10, output currents of the current transformers 21, 22 and 23, which are coupled to the AC power lines R, S and T of the AC power lines 10, correspondingly produces output currents at predetermined transforming ratio. The output currents are rectified by the full-wave rectifiers 31, 32 and 33, respectively. The rectified output currents of the full-wave rectifiers 31, 32 and 33 are fed to respective burden circuits 41, 42 and 43. The output signals of the burden circuits 41, 42 and 43 are transformed into mean values or effective values thereof by mean/effective value circuits 91, 92 and 93 of the mean/effective value circuit 90. A largest signal among the output signals of the mean/effective value circuits 91, 92 and 93 is given to A/D converter 100. This digital signal is fed to the microcomputer 110. The microcomputer 110 carries out level discrimination of digital input signal thereto in accordance with a predetermined program stored in the read-only memory 114. Furthermore, basing on the results of the level discrimination, a predetermined time-current operation is carried out, thereby to issue output signal. That is, the microcomputer 110 functions as the first level discrimination means and the first time-current operation means. The above-mentioned time-current operation is carried out, for instance, along the inverse long time-current characteristic of part A of FIG. 5. The output signal issued from the microcomputer 110 is fed to the gate of the thyristor 120, which is then turned on the drive the output device 80. Accordingly, the overcurrent indicator 180 indicates the occurrence of the overcurrent and at the same time the releasing device 80 actuate the interrupting connectors 201, 202 and 203. The above-mentioned time-current characteristic of the curves A, B and C are designed by taking account of the capacity of fuses in the upper stream part of the power line 10.

On the other hand, the output of the full-wave rectifier 31, 32 and 33 are given to the OR circuit 130 comprising diodes 131, 132 and 133. Since the output terminal of the OR circuit 130 is connected to the second level discrimination circuit 140 which, for instance, comprises at least one zener diode, when one input signal to the OR circuit 130 exceeds the second level, the discrimination circuit 140 gives output signal to the second time-current operating circuit 150, which accordingly carries out necessary time-current operation, and thereby triggers the gate of the thyristor 120. The time-current operation in this case is, for instance, as shown by the part B of the short time current inverse characteristic or the part C of instantaneous time-current characteristic. By the above-mentioned turn-on of the thyristor 120, the output device 80 is actuated, thereby its indicator 180 indicates the kind of the overcurrent and also drives the interruption connectors 201, 202 and 203.

In such prior art circuit breaker, the circuit is constituted using the means or effective value circuit or the level discriminating circuit having a threshold potential for peak detecting, and therefore it is difficult to respond quickly to an accidental overcurrent in a short-time-operation by using the mean or effective value circuit, because the mean or effective value circuit needs time delay operation therein, and also it is difficult to obtain effective time delay effect by using the level discriminating circuit. Furthermore, when the accidental overcurrent is reduced during a predetermined tripping time period, it is also difficult to stop the breaking operation of the circuit.

OBJECT AND SUMMARY OF THE INVENTION

It is an object of the invention to provide an improved circuit breaker having three independent time characteristics of long time mode, short time mode and instant mode.

A circuit breaker in accordance with the present invention comprises, at least one disconnectable contact provided in an A.C. power line, current sensor means provided in respective phases of A.C. power lines for detecting a values of current, phase selecting means for selecting a largest output value among secondary output signals corresponding to the current value of each phases of the current sensor means, largest value selecting means for extracting the largest value among the secondary outputs signals of the current sensor means, signal conversion means for obtaining a mean or an effective value of output signals of the phase selecting means, first level discriminating means for discriminating the level of the secondary output from the largest value extracting means, first time-current operating means for counting time period of overcurrent flow based on the discriminated result of the first level discriminating means, peak holding means for holding a peak value among output signals of raid the largest value extracting means, second level discriminating means for discriminating the level the peak holding means, second time-current operating means for counting time period of the overcurrent flow based on the discriminated result of the second level discriminating means, third level discriminating means for discriminating the level of output signals from the signal conversion means, and third time-current operating means for counting time period of the overcurrent flow based on the discriminated result of the third level discriminating means.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Hereinafter, details of the invention is described with reference to the drawings.

Figure 1:
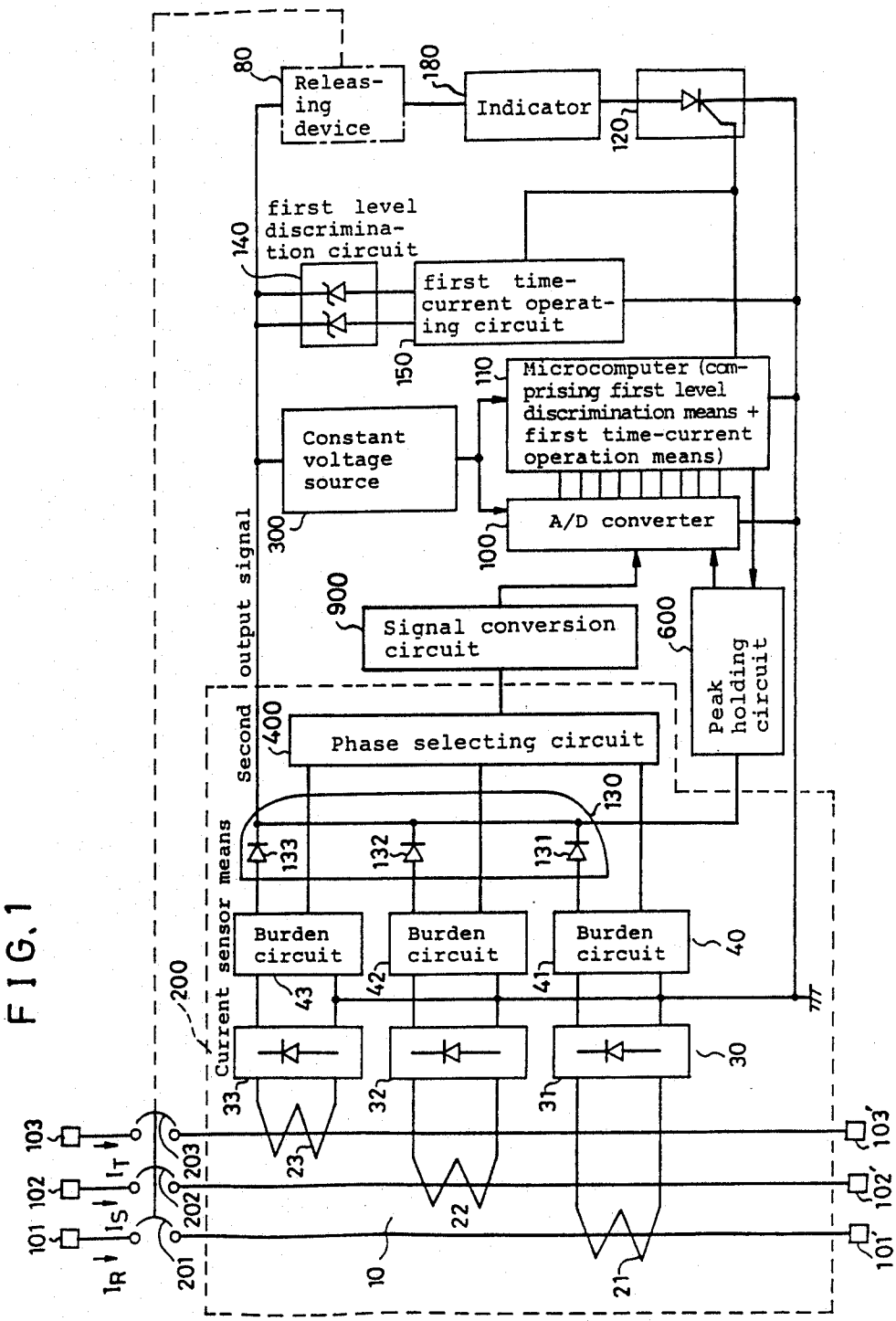
FIG. 1 is a circuit block diagram showing a preferred embodiment of a circuit breaker in accordance with the present invention.

FIG. 1 shows a preferred embodiment of a circuit breaker in accordance with the present invention.

In FIG. 1, on a set of power lines R, S and T of three phase power lines 10, current transformers 21, 22 and 23 of a current sensor means 200 are provided, respectively. Full-wave rectifiers 31, 32 and 33 are connected with its two input lines across both output lines of the current transformers 21, 22 and 23, respectively. Burden circuit 41, 42 and 43 are connected with their input lines to output lines of the full-wave rectifiers 31, 32 and 33, respectively, and each one of the input lines of the burden circuit 41, 42 and 43 are connected to input terminals of an OR circuit 130 as a largest value selecting means, which consists of three diodes 131, 132 and 133 and output terminal of which are connected in common as an output terminals of the OR circuit 130. Adjustable output terminals of the burden circuits 41, 42 and 43, wherefrom output signals can be obtainable in desirably adjusted levels, are connected to input terminals of phase selecting circuit 400. The phase selecting circuit 400 selects, as largest phase, a phase which consists of largest value in inputted values. The largest phase selected by the phase selecting circuit 400 is connected to a signal conversion circuit 900 for obtaining a means or an effective value of inputted value. The converted output signal of the signal conversion circuit 900 is converted from analog signal into digital signal by an A/D converter 100. The digital output of the A/D converter 100 is inputted to a microcomputer 110. The output of the microcomputer 110 is connected to a gate of thyristor 120 for operating a releasing device 80. The releasing device 80 actuates the disconnectable contact to disconnect.

The output of an OR circuit 130 is connected to first time-current operation circuit 150 through zener diodes 140. And also the output of the OR circuit 130 is connected to a peak holding circuit 600. The peak holding circuit 600 is connected to the microcomputer 110 and controlled by the microcomputer 110. An output of the first time-current operation circuit 150 is connected to the gate of thyristor 120 for operating a releasing device 80. The releasing device 80 disconnects the disconnectable contacts 201, 202 and 203 in response to on state of the thyristor 120.

Figure 2:
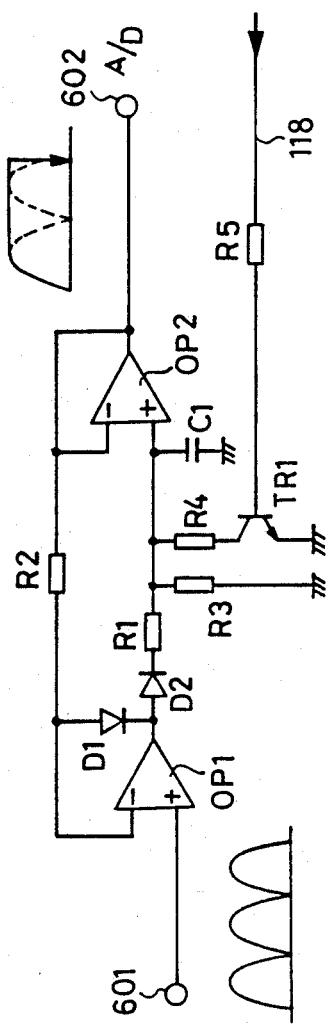
FIG. 2 is a circuit diagram showing a peak holding circuit 600 of the circuit breaker shown in Fig. 1.

A preferred example of the peak holding circuit 600 is shown in FIG. 2. An input terminal 601 for receiving the output from the OR circuit 130 is connected to a positive input terminal of an operational amplifier $OP_1$. An output terminal of the operational amplifier $OP_1$ is connected to diode $D_2$ through a resistor $R_1$ for charging a capacitor $C_1$. A diode $D_2$ is connected to the output terminal of the operational amplifier $OP_1$ for prevention of the discharge of the capacitor $C_1$. As a result, peak holding effect is obtained. The diode $D_1$ is connected between the output terminal and the negative input terminal of the operational amplifier $OP_1$ for offsetting the effect of the threshold potential of the diode $D_2$. A resistor $R_3$ is connected to the capacitor $C_1$ in parallel for constituting a discharging circuit, and the value of the resistor $R_3$ is selected in a level not to badly affect to the peak holding functions. The resistor $R_1$ is disposed for restricting the charging current to the capacitor $C_1$, and the value of the resistor is also selected in a level not to badly affect the peak holding function. A resistor $R_4$, the emitter and the collection of a transistor $TR_1$ are serially connected and they are also connected to the capacitor $C_1$ in parallel for constituting a forcible discharging circuit of the capacitor $C_1$. The base of the transistor $TR_1$ is connected to the microcomputer 110 through a resistor $R_5$ for receiving a control signal from the microcomputer 110. One terminal of the capacitor $C_1$ is connected to a positive input terminal of an operational amplifier $OP_2$. An output terminal of the operational amplifier $OP_2$ is connected to an output terminal 602 for issuing an output signal to the A/D converter 100 in FIG. 1, and also to a negative input terminal of the operational amplifier $OP_2$. The resistor $R_2$ is connected to the negative input terminal of the operational amplifier $OP_1$ for supplying biasing current to the diode $D_1$.

Figure 6:
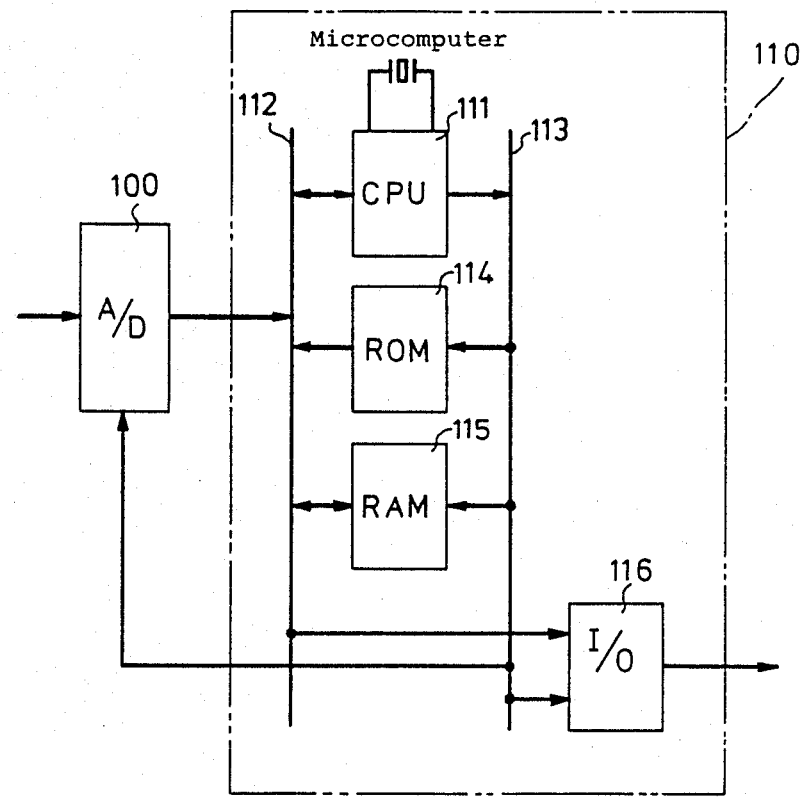
FIG. 6 is a block diagram of a known microcomputer 110.

The constitution and operation of the microcomputer 110 are described with reference to FIGS. 6 and 7 hereafter. FIG. 6 is a circuit block diagram of the microcomputer 110. As shown in FIG. 6, the microcomputer 110 comprises a central processor unit 111, a read-only memory 114, a random-access memory 115, an I/O port 116, a data bus 112 and the address bus 113. Parts of the data bus 112 and the address bus 113 are also connected to the A/D converter 100. The read-only memory 114 stores a program for executing necessary signal processing, and also data for a long time characteristic, a short time characteristic and an instant time characteristic of the first time-current operating means. The central processor unit 111 contains clock signal means necessary therefore. The random-access memory 115 functions as a register which is necessary for the signal processing.

Figure 7:
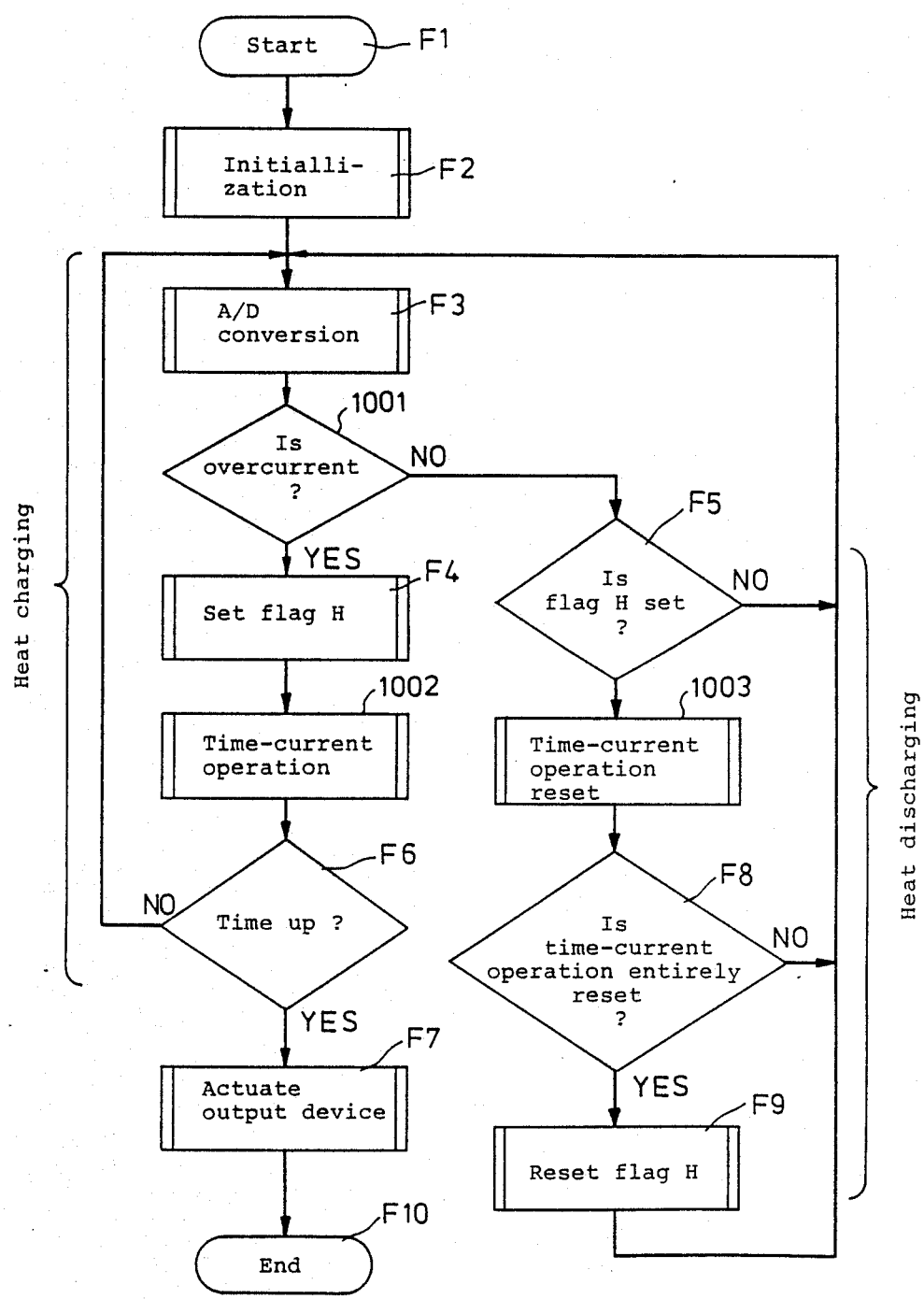
FIG. 7 and FIG. 8 are flow charts showing operation of the microcomputer shown in FIG. 5.

FIG. 7 is a flow chart of the computer program for the microcomputer 110. The flow chart contains a first level-discrimination step (a step 1001) and a first time-current operating step (a step 1002) for performing a first time-current operation in response to the output of the first level discrimination means. The flow chart also contains reset means (a step 1003) for resetting the register in response to radiation characteristics (of the power line and the load).

When the overcurrent(s) flows in the AC power lines 10, output currents of the current transformers 21, 22 and 23, coupled to the AC power lines R, S and T of the AC power lines 10, correspondingly produces output currents at predetermined transforming ratios. The output currents are rectified by the full-wave rectifiers 31, 32 and 33, respectively. The rectified output currents of the full-wave rectifiers 31, 32 and 33 are fed to respective burden circuits 41, 42 and 43. The outputs of burden circuits 41, 42 and 43 are inputted to a phase selecting circuit 400 which selects, as largest value phase, a phase which consists of largest value from inputted phases. The selected largest value phase is inputted to the signal conversion circuit 900 and converted into means or effective signal. The mean or effective output is fed to the A/D converter 100 which converts the analog signal into digital signal. This digitial signal is fed to the microcomputer 110, which carries out level discrimination step with respect to the digital signal. Further, the microcomputer carries out first time-current operation and issues an output signal from the output port 116. The output signal is fed to the gate of thyristor 120 for driving the releasing device 80 which disconnects the disconnectable contacts 201, 202 and 203.

On the other hand, outputs of the burden circuits 41, 42 and 43 are inputted to OR circuit 130 which consists of the diode 130, 131 and 132. The output of the OR circuit 130 is connected to the first time-current operating circuit 150 through the zener diodes 140 as second level-discrimination. Therefore, when the output of OR circuit 130 is over a zener voltage of the zener diode 140, the output of OR circuit 130 is fed to the first time-current operating circuit 150. The first time-current operating circuit 150 carries out the predetermined second time-current operation for triggering the thyristor 120 for driving the releasing device 80.

Figure 3:
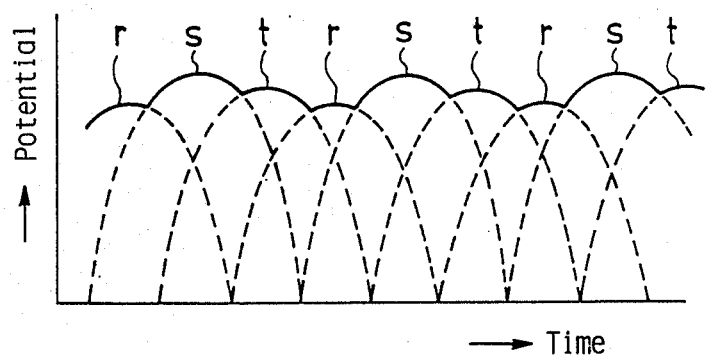
FIG. 3 and FIG. 4 are waveforms treated in the circuit breaker in accordance with the present invention.
Figure 4:
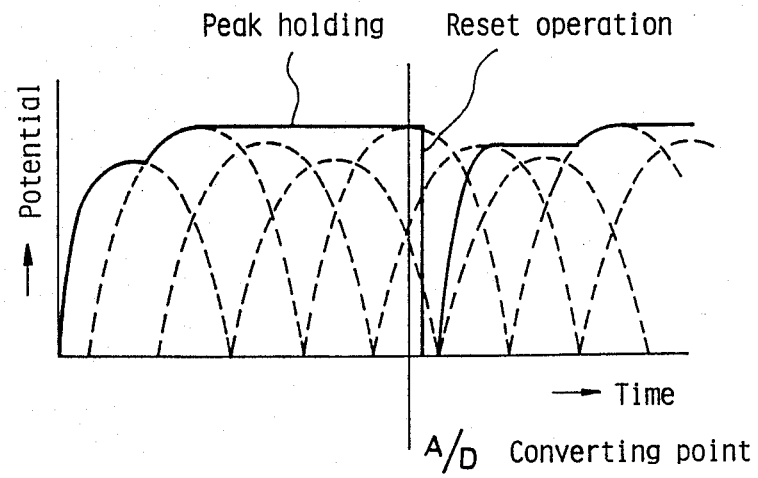

When the output signal of the OR circuit shown in FIG. 1 is entered the inputterminal 601 as a wave form shown in FIG. 3 (therein, the letter r,s and t respectively show the elements of the signals of each respective phases), such input signal is entered the positive input terminal of the operational amplifier $OP_1$ which serves as a buffer circuit and a threshold potential compensating circuit of the diode $D_2$. The output of the operational amplifier $OP_1$ charges the capacitor $C_1$ through the diode $D_2$ and the resistor $R_2$. As a result, a peak value is held as shown in FIG. 4 (peak holding). The peak holding signal which is held in the capacitor $C_1$ is given to the positive input terminal of the operational amplifier $OP_2$ which serves as a buffer circuit. The output signal of the operational amplifier $OP_2$ is issued to the A/D converter 100 shown in FIG. 1 and treated in the predetermined process. the resistor $R_2$ is connected between the negative input terminal of the operational amplifier $OP_2$ and the diode $D_1$ for supplying the biasing current to the diode $D_1$. The diode $D_1$ generates a potential equal to the threshold potential of the diode $D_2$ for compensating a potential for charging the capacitor $C_1$.

The peak holding value which is the charge potential of the capacitor $C_1$ is converted to a digital signal by the A/D converter 100 and the converted digital signal is entered the microcomputer 110 and processed in a predetermined process.

When the above-mentioned A/D conversion is completed, the charge of the capacitor $C_1$ is forcibly discharged and reset by the transistor $TR_1$ in a preset timing for making preparation for next peak holding. The transistor $TR_1$ serves as a gate control function of the peak holding and a reset function of the forcible discharge. FIG. 4 shows a wave form corresponding to the above-mentioned operation, and especially shows the reset action of the forcible discharge after A/D conversion.

Figure 5:
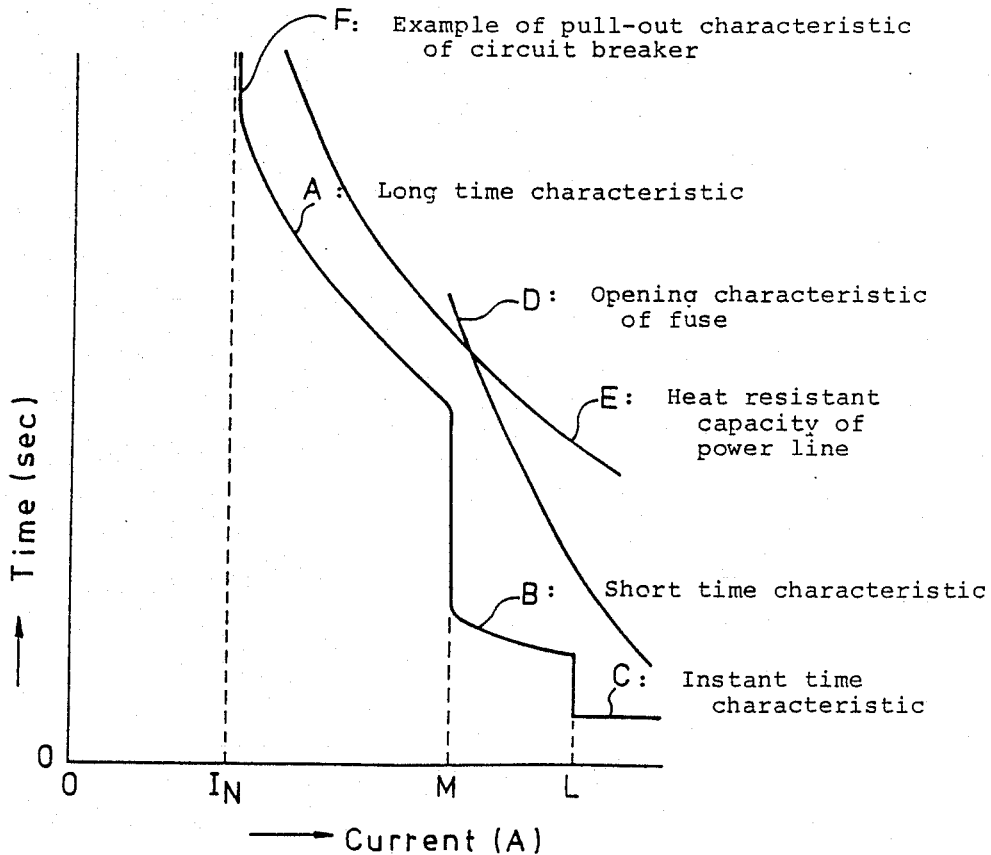
FIG. 5 is the current vs. time characteristic graph of circuit breaker.

The microcomputer 110 rises up, and then the computer program shown in flow char of FIG. 7 starts. The system is initialized (i.e. setting of I/O port, and setting/resetting of flags are made,) at a step F2. Then, the microcomputer 110 controls the A/D converter 100 to convert the output signal of signal conversion circuit 90 into digital signal (step F3). This digital data is stored in a RAM 115. Next, it is determined whether this digital data indicate overcurrent or not (step 1001). This step includes a second level discriminating function for the mean or effective value signal and a third level discriminating function for the peak holding signal. When the digital data does not show an overcurrent, the operation jumps from the heat charging routine to the heat discharging routine and then returns to the A/D conversion (step F3). When the digital data shows an overcurrent, a heat charging flag H is set in the step F4, and bits for heat charging is added for every predetermined unit times by utilizing random access memory 115 or a register in the central processor unit 114, so as to count time responding to amount of input signal level. The heat charging bits are selected in order to realize time-current operation along the characteristic curves of FIG. 5. The time-current operation includes a second time-current operation based on the discriminated result of the first level discrimination and a third time-current operation based on the discriminated result of the second level discrimination, and the second and the third time-current operation are respectively corresponding to the long time characteristic A and the short time characteristic B in FIG. 5. Then, the added bits number is examined whether the time is up for the selected time-current operation of the predetermined characteristic. And as a result, when the added bits number does not yet reach the predetermined number, in other words, when the time is up, an output is issued through the I/O port 116 to drive the thyristor 120, and thereby to actuate the first indicator 180 and the output device 80.

Next, operation of heat discharging routine, namely, the routine for resetting the time-current operation is described. The steps F5, 1003, F8 and F9 together form a heat discharing routine. It is discriminated whether the heat charging flag H has been set or not (step F5). When the heat charging flag H has been set, the heat charging flag H is decreased at the step 1003 for every predetermined unit times. When the counter number of the bits becomes 0 as a result of the subtractions in the step F9, the heat discharging routine goes back from the step F9 to the A/D conversion step F3. When the counted number of the bits is not entirely reset, the heat charging flag H is not reset and the heat discharging routine goes back from the step F8 to the A/D conversion step F3.

Figure 8:
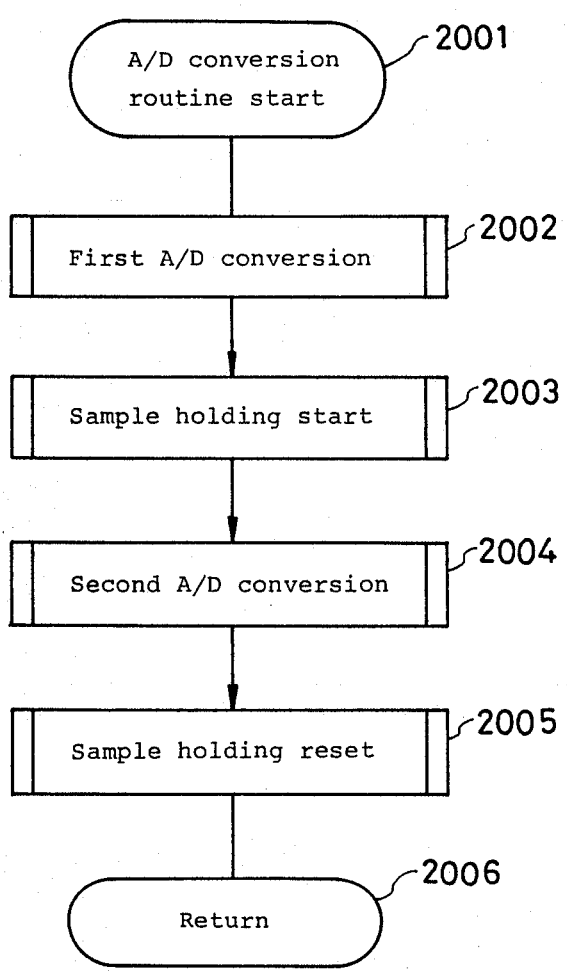
Figure 9:
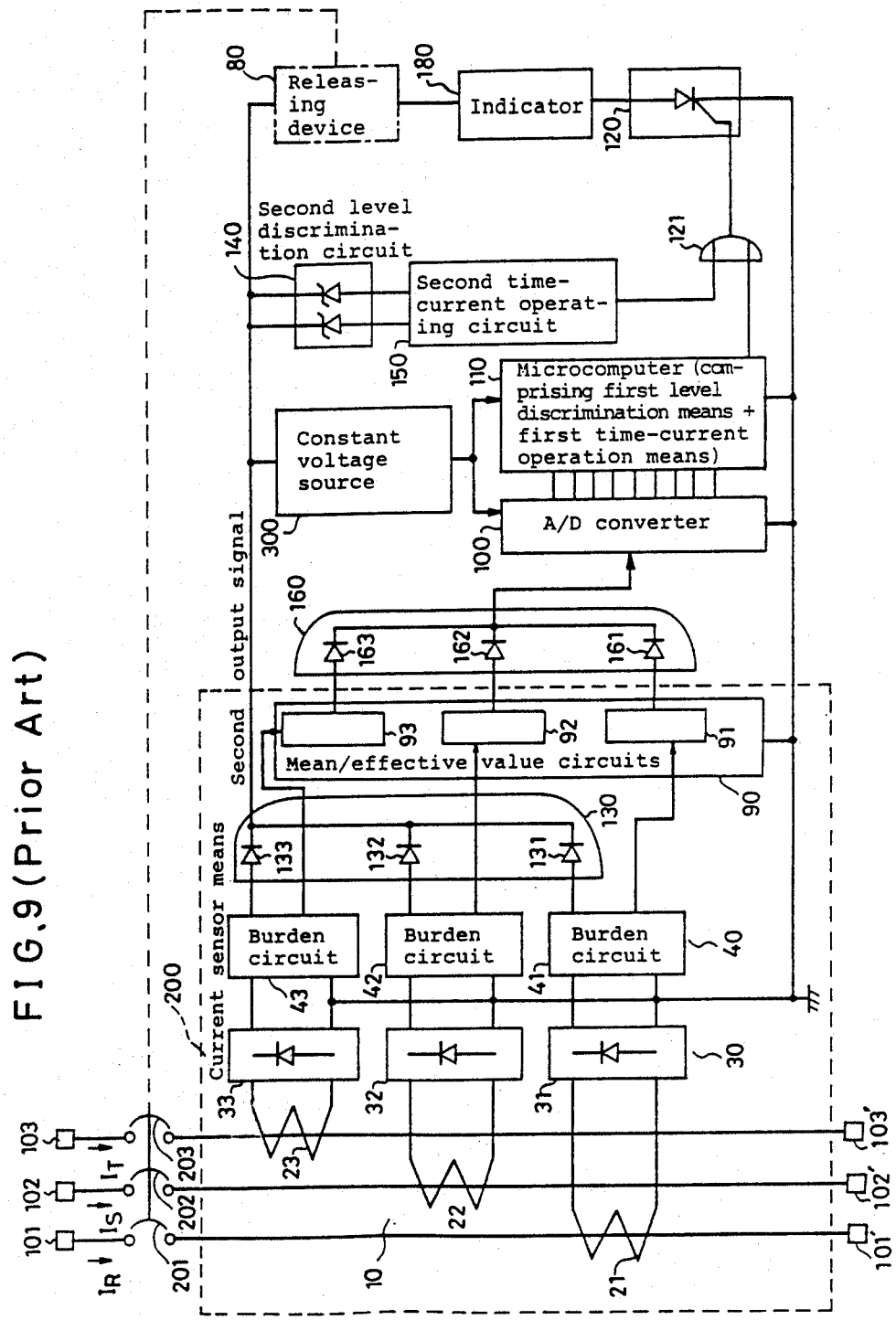
FIG. 9 is the circuit block diagram showing the circuit breaker of the prior art.

Details of the A/D conversion (step F3) is shown in FIG. 8. When the A/D conversion operation starts (step 2001), the output of the analogue signal converting circuit 900 corresponding to the effective or mean value is converted to digital data by A/D converter (step 2002), and the converted digital data is stored in predetermined registor. Next, the peak value is sample held (S/H) by controlling the transistor TR₁ of the peak holding circuit 600 (step 2003), and the held analogue peak value is converted to digital data by the A/D conversion process (step 2004) and stored in predetermined registor. After that the digital data stored in the registor is transmitted to next process of discriminating whether an overcurrent flows or not. When the A/D conversion routine is finished, the charge stored in the capacitor $C_1$ is forcibly discharged by the operation of the transistor $TR_1$ at resetting of sample holding (S/H) (step 2005). As a result, the operation of the microcomputer 110 passes through the A/D conversion routine for making preparation of next peak holding.

As mentioned above, the circuit breaker in accordance with the present invention has three independent routes consist of the level discriminating process and the time-current operation process respectively corresponding to long time, short time and instant operation.

And the microcomputer gives most appropriate time-current operating characteristic, taking account of heat charging and heat discharging in the electric power lines and loads. Incidentially, addition or substraction of the heat charging and heat discharging can be executed in the inverse order to the above-mentioned embodiment.

What is claimed is:

1. A circuit breaker for use with a multiphase A.C. power line, said circuit breaker comprising:
   at least one disconnectable contact provided in series with said A.C. power line;
   current sensor means provided for each of the respective phases of said A.C. power line for detecting values of current in said respective phases and, in response, outputting corresponding sensed alternating current signals;
   means for rectifying said sensed alternating current signals to produce full wave rectified alternating current signals
   predominant phase selecting means for selecting the sensed alternating current signal having the largest amplitude among said sensed alternating current signals of said current sensor means and for outputting at least a half-cycle of said sensed alternating current signal;
   largest value detecting means for detecting the largest amplitude value among said full wave rectified alternating current signals of said current sensor means and outputting a pulsating DC current signal;
   peak holding means for storing a peak value of said pulsating D.C. current signal;
   signal conversion means for converting said sensed alternating current signal selected by said predominant phase selecting means to obtain a mean or effective value thereof;
   first level discriminating means for detecting when a level of said largest value detected by said largest value detecting means is, instantaneously, above a first predetermined value;
   first time-current operating means for outputting a trip signal when said first level discriminating means detects that the level of said largest value is above said first predetermined level;
   second level discriminating means for detecting when the peak value in said peak holding means is above a second predetermined value;
   second time-current operating means for timing a period during which said second level discriminating means continuously detects that said peak value is above said second predetermined value and, in response to expiration of a predetermined short time period, outputting said trip signal;
   third level discriminating means for detecting when said mean or effective value is greater than a third predetermined value; and
   third time-current operating means for timing a period during which said mean or effective value is greater than said third predetermined value and, in response to continuously detecting said mean or effective value of a predetermined long time period greater than said predetermined short time period, outputting said trip signal.

2. A circuit breaker for use with a multiphase A.C. power line, said circuit breaker comprising:
   current sensor means provided in respective phases of said A.C. power line for detecting respective values of current in said phases and generating respective current signals corresponding to said values;
   predominant phase selecting means for selecting the phase having the largest current value among said current signals generated by said current sensor means and for outputting at least a half-cycle of said selected phase;

largest value selecting means for selecting the largest value among said current signals generated by said current sensor means, and generating an output signal corresponding to said largest value;

signal conversion means for obtaining a mean or an effective value output signal from said current signal corresponding to said phase selected by said predominant phase selecting means;

first level discriminating means for detecting when said output signal from said largest value selecting means is greater than a first predetermined value;

first time-current operating means for instantaneously releasing said disconnectable contact when said level of said output from said largest value extracting means is greater than said first predetermined value;

peak holding means for storing a peak value of an output signal from said largest value extracting means when said output signal is below said first predetermined value;

second level discriminating means for detecting when the level of said peak value stored by said peak holding means is continuously greater than a second predetermined value;

second time-current operating means for timing a period during which said level of said stored peak valve is continuously greater than said second predetermined value and, in response to expiration of a predetermined short time period, releasing said disconnectable contact;

third level discriminating means for detecting when the level of output signal from said signal conversion means is greater than a third predetermined value; and third time-current operating means for timing a period during which said level of output signals from said signal conversion means is continuously greater than said third predetermined value and, in response to expiration of a predetermined long time period greater than said short time period, releasing said disconnectable contact.

3. A circuit breaker in accordance with claim 2, further comprising reset means for resetting and initializing said peak holding means.

4. A circuit breaker in accordance with claim 3, wherein
said reset means in controlled by a microcomputer for resetting said peak holding means in a predetermined frequency of time period by receiving reset signals from said microcomputer.

5. A circuit breaker for use with a multiphase A.C. power line, said circuit breaker comprising:

power interruption means in series with said A.C. power line for interrupting said A.C. power line in response to an overcurrent trip signal;

current sensor means for producing A.C. sample signals corresponding to respective electrical current magnitudes in each of the phases of said A.C. power line;

rectifier means for converting and combining said A.C. sample signals into a pulsating D.C. signal;

peak holding means for resettably storing a peak value of said pulsating D.C. signal;

phase selection means for selecting one of said A.C. sample signals corresponding to the phase having the largest electrical current magnitude measured by said current sensor means and outputting at least a half-cycle of said selected signal;

signal conversion means for converting said A.C. signal output by said phase selection means to obtain a mean or effective current value thereof;

instantaneous power interruption means for generating said overcurrent trip signal in response to a level of said pulsating D.C. signal exceeding a predetermined first trip current level;

fast power interruption means for generating said overcurrent trip signal in response to a level of said stored peak value continuously exceeding a second predetermined trip current level for a predetermined short period of time; and averaging power interruption means for generating said overcurrent trip signal in response to a level of said mean or effective current value continuously exceeding a predetermined third trip current level for a predetermined long period of time, said predetermined long period of time being greater than said predetermined short period of time.

* * * * *